United States Patent
McGuire et al.

(10) Patent No.: US 9,381,564 B2
(45) Date of Patent: Jul. 5, 2016

(54) 3-D PRINTED CASTING SHELL AND METHOD OF MANUFACTURE

(71) Applicant: WISYS TECHNOLOGY FOUNDATION, INC., Madison, WI (US)

(72) Inventors: Daniel S. McGuire, Oregon, WI (US); Eric E. Hellmstrom, Tallahassee, FL (US); Charles M. Olson, Ft. Atkinson, WI (US)

(73) Assignee: WISYS Technology Foundation, Inc., Madison, WI (US)

( * ) Notice: Subject to any disclaimer, the term of this patent is extended or adjusted under 35 U.S.C. 154(b) by 0 days.

(21) Appl. No.: 14/453,285

(22) Filed: Aug. 6, 2014

(65) Prior Publication Data

US 2015/0041098 A1   Feb. 12, 2015

Related U.S. Application Data

(60) Provisional application No. 61/862,738, filed on Aug. 6, 2013.

(51) Int. Cl.
| | |
|---|---|
| *B22C 1/10* | (2006.01) |
| *B22C 9/04* | (2006.01) |
| *B22C 9/10* | (2006.01) |
| *B22C 1/22* | (2006.01) |
| *B22C 1/26* | (2006.01) |
| *B22C 9/02* | (2006.01) |

(52) U.S. Cl.
CPC ... *B22C 1/10* (2013.01); *B22C 1/22* (2013.01); *B22C 1/26* (2013.01); *B22C 9/02* (2013.01); *B22C 9/04* (2013.01); *B22C 9/10* (2013.01)

(58) Field of Classification Search
CPC .............. B22C 1/10; B22C 9/02; B22C 9/10; B28B 1/001; B29C 67/0051
USPC .......... 164/23, 24, 516–529; 106/38.2, 38.22, 106/38.27, 38.28, 38.3
See application file for complete search history.

(56) References Cited

U.S. PATENT DOCUMENTS

| | | | |
|---|---|---|---|
| 4,602,667 A | | 7/1986 | Moore et al. |
| 5,204,055 A | * | 4/1993 | Sachs et al. ........................ 419/2 |
| 6,112,804 A | * | 9/2000 | Sachs et al. ................... 164/348 |
| 7,173,079 B2 | | 2/2007 | Rabe et al. |
| 7,533,713 B2 | | 5/2009 | Pfeifer et al. |
| 2004/0007345 A1 | * | 1/2004 | Yasrebi et al. ................ 164/516 |
| 2005/0197431 A1 | | 9/2005 | Bredt et al. |

OTHER PUBLICATIONS

Three Dimensional Printing, Julie Kaczynski, http://web.mit.edu/tdp/www/ceramic.html, Jun. 28, 2000.*
D.L. McCarthy et al.; Creating Complex Hollow Metal Geometries Using Additive Manufacturing and Electroforrning; McCarthy; In International Solid Freeform Fabrication Symposium; pp. 108-120. 2012. USA.
Admitted Prior Art; whole document; 2 pages; USA.

* cited by examiner

*Primary Examiner* — Kevin E Yoon
(74) *Attorney, Agent, or Firm* — Boyle Fredrickson, S.C.

(57) ABSTRACT

A printable refractory material is provided having a liquid and powder component configured for use in a 3-D powder printer, where the material forms hydraulic bonds when the liquid and powder components are combined. Methods of printing the refractory material and forming castings therefrom are also provided.

20 Claims, 2 Drawing Sheets

US 9,381,564 B2

3-D PRINTED CASTING SHELL AND METHOD OF MANUFACTURE

CROSS REFERENCE TO RELATED APPLICATION

This case claims the benefit of provisional application 61/862,738 filed Aug. 6, 2013 and hereby incorporated by reference.

BACKGROUND OF THE INVENTION

The present invention relates to a casting shell or refractory mold and in particular to a casting shell formed by additive fabrication or three dimensional printing, the three dimensionally printable refractory material and a method of manufacturing the casting shell using such a material.

Current metal casting methods, such as investment casting include the initial steps of fashioning a pattern that may be made of a volatizable material such as wax or foam duplicating the desired cast part. The pattern is then encased in a shell material, for example, a liquid ceramic material which cures to form a layer of a ceramic shell around the sacrificial pattern. Through the repetition of adding additional layers, the ceramic shell becomes strong enough to withstand the heat and pressure of receiving molten metal therein. The shell material is then heated to melt and volatize the pattern leaving a hollow cavity corresponding to the pattern. Casting material, for example molten metal, may then be poured down into the cavity. When the casting material has hardened, the surrounding ceramic shell is removed from the cast part.

While the current metal casting method results in the formation of high quality castings, it is a time consuming process and often expensive. Accordingly, it is desirable to introduce a method of manufacturing casting shells, i.e. refractory molds, which require fewer fabrication steps. By way of reducing the number of fabrication steps, such a method of manufacturing a casting shell would also reduce the potential for either human or equipment errors that may otherwise occur.

With the improvement of additive fabrication techniques and hardware, it is possible to use a 3-D powder printer to create a ceramic refractory casting shell without the use of a sacrificial pattern and the repetitive layering and drying steps associated with traditional investment casting shell manufacturing. However, while the additive fabrication hardware has improved to allow for the 3-D printing of casting shells, prior attempts to do so have failed to provide a three dimensionally printable refractory material suited for manufacturing high quality casting shells. Accordingly, there remains a need for a refractory material that is capable of being three dimensionally printed into a functioning casting shell for the casting of materials such as molten metal.

SUMMARY OF THE INVENTION

The present invention provides a refractory material intended to provide a solution for creating a 3-D printable refractory shell for metal casting. Typically ceramic shell systems require the creation of a sacrificial pattern and repetitive liquid refractory material applications, each of which is followed by a significant drying time, to form a shell. This invention entirely eliminates the need for a sacrificial pattern for each refractory shell, and further reduces the time and cost of manufacturing a refractory shell by way of directly printing the 3-D refractory shell from a powder printer dispensing a refractory material. The refractory material of the present invention includes a liquid component and a powder component, in which a layer of the powder component is broadly dispersed and followed by an application of the liquid component in a controlled location. The reaction between the liquid and powder components results in hydraulic bonding of the particles in the powder component, when reacted with the liquid component. Repetition of this layering process results in the manufacture of a 3-D refractory shell in a stepwise, layer-by-layer method, where an associated computer controls the application of liquid and powder to form a 3-D refractory shell with an interior cavity shape corresponding to the shape of the desired metal object to be cast.

It is one feature of at least one embodiment of the invention to provide a refractory material having a liquid and powder component configured for use in a 3-D powder printer, that result in the formation of hydraulic bonds when combined.

It is one feature of at least one embodiment of the invention to provide a method of manufacturing a metal casting using a 3-D printable refractory shell formed from hydraulically bonded refractory material.

It is one feature of at least one embodiment of the invention to provide a method of manufacturing a metal casting using a 3-D printable refractory shell having one or more integrated fluid and gas manifolds, formed from hydraulically bonded refractory material.

It is one feature of at least one embodiment of the invention to provide a method of manufacturing a metal casting using a 3-D printable refractory shell having both an outer shell defining the outer surface of the metal casting and one or more inner core shells defining the inner surface of a metal casting's inner core, formed from hydraulically bonded refractory material.

It is one feature of at least one embodiment of the invention to provide a 3-D printable refractory shell formed from multiple, distinct hydraulically bonded refractory materials.

It is one feature of at least one embodiment of the invention to provide a 3-D printable refractory shell formed from refractory materials of varying hydraulic bond strength, It is one feature of at least one embodiment of the invention to provide a 3-D printable refractory core shell configured to correspond to a shape of a void in an object to be cast.

These particular objects and advantages may apply to only some embodiments falling within the claims and thus do not define the scope of the invention.

BRIEF DESCRIPTION OF THE DRAWINGS

One or more preferred exemplary embodiments of the invention are illustrated in the accompanying drawings in which like reference numerals represent like parts throughout and in which.

Figure 1:
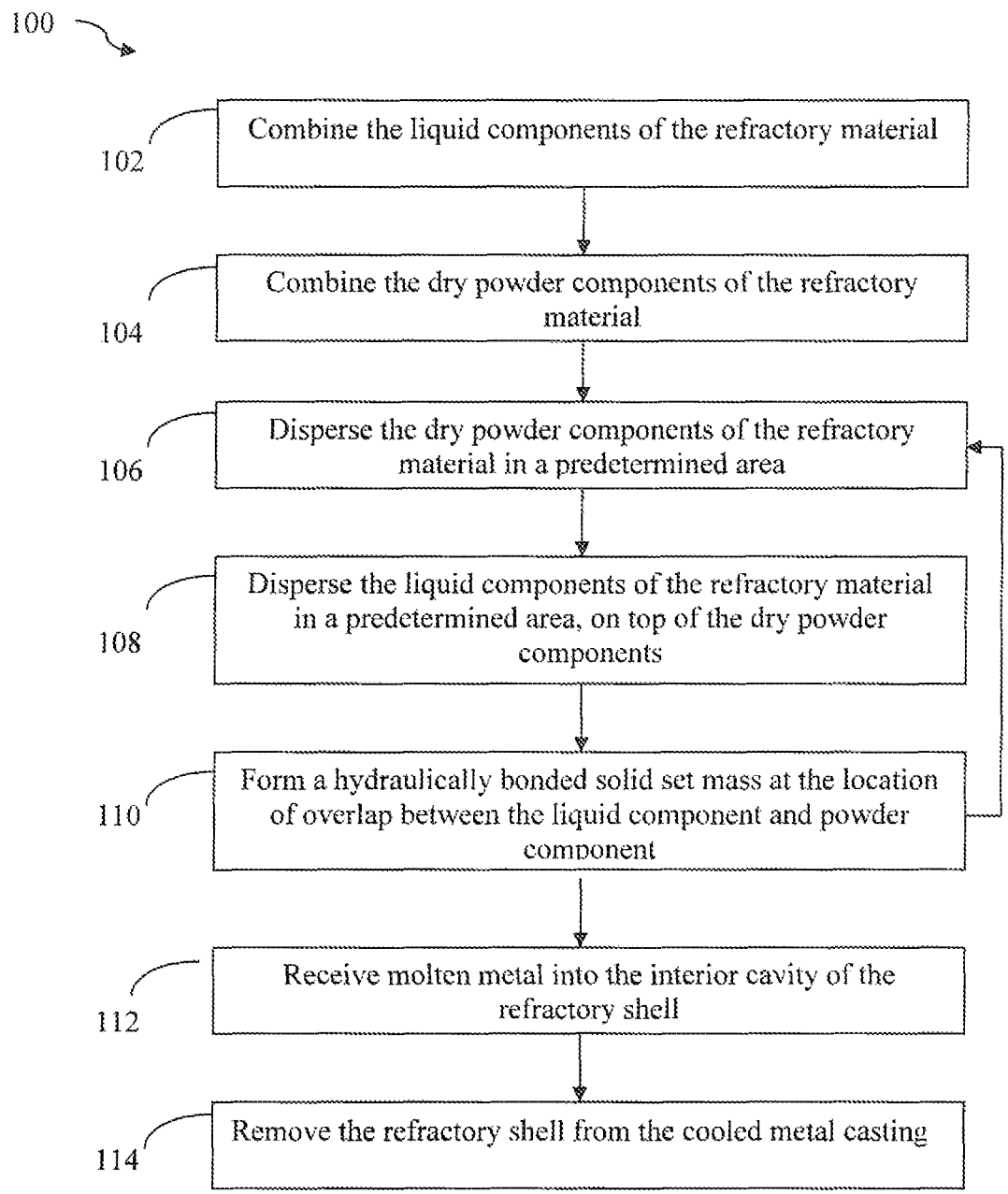
FIG. 1 is a flow chart showing a method of manufacturing a metal casting from a three dimensionally printed refractory shell using the refractory material according to an embodiment of the present invention.

It is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

In one embodiment of the current invention, the material suitable for use in a 3-D powder printer may be a two-component material, including a liquid component and a dry-powder component as follows in Table 1. While the weight and percent weight of those ingredients identified in the following table may constitute a preferred embodiment, the present invention is not to be considered limited to the particular weight or percent weight represented in Table 1, but rather a reasonable range of each ingredient, for example plus or minus five percent unless otherwise specified herein, is also considered within the scope of this invention.

TABLE 1

| Element | Amount (by weight) | Approximate Percent by Weight |
|---|---|---|
| Liquid Component of the Refractory Material | | |
| Lithium chloride (LiCl) | 30.4 g | 23.1 |
| Modified corn starch | 0.25-1.0 g | 0.8 |
| Distilled water | 100 g | 76.1 |
| Dry Powder Component of the Refractory Material | | |
| Calcium aluminate cement | 70.0 g | 70.0 |
| Tabular alumina (320 mesh) | 15 g | 15.0 |
| Ferro Frit #3134 (300 mesh) | 14.6 g | 14.6 |
| Kelco-Crete 200 | 0.4 g | 0.4 |

Referring now to the method 100 of FIG. 1, a casting utilizing the refractory material according to the general formulation listed in Table 1 is formed by first combining the elements of the liquid component, including lithium chloride (LiCl), modified corn starch, and distilled water in block 102. Separately, the elements of the dry or powder component are combined, including calcium aluminate cement, tabular alumina (320 mesh), Ferro Frit #3134 (300 mesh), Kelco-Crete 200 in block 104 into a pulverized powder having a particle size that is equal to or less than 100 μm in diameter. This minimal particle size provides greater surface area for subsequent contact and bonding with the liquid component, resulting in a decreased set time. After the respective components are combined, a thin layer of the powder component is deposited in a predetermined area at block 106. Preferably the layer of powder component is less than or equal to 100 μm. After the powder component has been deposited, a volume of the liquid component is dispersed over the top of the powder component in a predetermined location at block 108. At subsequent block 110 the liquid and powder components form a hydraulic bond resulting in the formation of a solid set mass at the location of overlap between the liquid component and powder component. Blocks 106, 108 and 110 are then repeated, in which additional alternating layers of powder component and liquid component are applied in predetermined locations, thereby forming a 3-D refractory shell in a step-wise, layer-by-layer fashion. When used in a 3-D printer, an associated computer may specify the location of powder and liquid component application to correspond to a computer generated casting model. After the resultant 3-D refractory shell, having an interior cavity shape corresponding to the shape of the desired metal object, i.e., computer generated casting model, has been formed, it may directly receive a molten metal into the interior cavity shape at block 112. Alternatively, the resultant 3-D refractory shell may be dried, cleaned of excess refractory material, kiln heated, flash heated, and/or receive a face coating before receiving molten metal. During the drying and subsequent heating steps, the refractory shell material undergoes a series of three phase changes. First, at or around room temperature, the shell material forms gels or calcium aluminate hydrates and aluminum hydrates that contain water molecules. Second, when the shell is heated to between 390 and 660° F., calcium alumina and alumina oxide are forms as a result of water loss. Third, when the shell is heated between 1100 and 3000° F. additional calcium aluminate formation continues. However, it is also noted that for those variations of the dry powder composition that include a lower percentage by weight of calcium aluminate cement, for example 25 percent by weight, and additional tabular alumina, which is considered well within the scope of this invention, the resultant equilibrium of calcium aluminates present in the shell will alter accordingly. Once the molten metal is then cooled, the refractory shell is removed at block 114.

A benefit of this embodiment is that the hydraulic bond formation at block 110 is an immediate or near-immediate set and capable of withstanding casting temperatures through 3000° F.; as opposed to alternative ceramic curing methods, which require larger amounts of time for organic substrate components to be removed prior to ceramic curing. Resultantly, the hydraulic bond formation of the present embodiment provides for the rapid addition of subsequent layers to the 3-D printed refractory shell, at blocks 106, 108. Furthermore, the hydraulic bond formation at block 110 does not result in the occurrence of measurable or significant shrinkage in the 3-D printed refractory shell during bond formation, in contrast to the often noticeable and undesirable shrinkage that occurs during ceramic curing stages during traditional casting methods.

In another alternative preferred embodiment of the current invention the refractory material suitable for use in a 3-D powder printer may he a two-component material, including a liquid component and a dry-powder component as follows in Table 2. While the approximate percent weight of those ingredients identified in the following table may constitute a preferred embodiment, the indicated range in percent weight of each ingredient is also considered within the scope of this invention.

TABLE 2

| Element | Approximate Percent | Approximate Range of Percent |
|---|---|---|
| Liquid Component of the Refractory Material (Percentage by Volume) | | |
| Distilled water | 81.35 | 50.0-100.0 |
| Sorbitol (70% sorbitol 30% water) | 18.30 | 0.0-50.0 |
| Proxel GXL | 0.04 | 0.0-2.0 |
| Surfynol | 0.31 | 0.0-2.0 |
| Dry-Powder Component of the Refractory Material (Percentage by Weight) | | |
| Calcium aluminate cement (CA-14W) | 86.0 | 1.0-100.0 |
| Plastic Resin Glue | 2.50 | 0.0-10.0 |
| Powdered Confectionary Sugar | 2.50 | 0.0-10.0 |
| Powdered Surfactant (Acetylenic Diol) (Surfynol | 0.50 | 0.0-2.0 |

TABLE 2-continued

| Element | Approximate Percent | Approximate Range of Percent |
|---|---|---|
| 500s) | | |
| Polyvinyl Alcohol (Selvol 203s and/or 205s) | 1.00 | 0.0-10.0 |
| Ferro Frit #3195 | 3.25 | 0.0-50.0 |
| Spinel 25 (325 mesh) | 4.00 | 0.0-75.0 |
| Fumed Silica (Sipernat 22s) | 0.25 | 0.0-25.0 |

Referring again to the method 100 of FIG. 1, a casting utilizing the refractory material according to the general formulation listed in Table 2 is formed by first combining the elements of the liquid component, including Sorbitol, Proxel GXL, Surfynol, and distilled water in block 102. Separately, the elements of the dry or powder component are combined, including calcium aluminate cement (CA14W), Plastic Resin Glue, Powdered Confectionary Sugar, Surfynol 500s powdered Surfactant (Acetylenic Diol), Selvol 203s or 205s Polyvinyl Alcohol, Ferro Frit #3195 (300 mesh), Spinel 25 (325 mesh), and Fumed Silica (Sipemat 22s) in block 104 into a pulverized powder having a particle size that is equal to or less than 100 µm in diameter.

Of the dry or powdered elements identified above in Table 2, calcium aluminate cement number CA-14W available at Almatis® is desirable due to its purity, 70% alumina content and ability to form a hydraulic set during hardening when combined with the water-based liquid component, at subsequent block 110. The CA-14W calcium aluminate cement is also configured to be subject to extreme heat exposure immediately upon set, which, for pure calcium aluminate cement, typically occurs within, several hours. However, it is also noted that variations of the dry powder composition that include a lower percentage by weight of calcium aluminate cement, for example 25 percent by weight or greater, and the addition of tabular alumina, is also considered well within the scope of this invention, as was previously above. The plastic resin glue, such as DAP Weldwood plastic resin glue is a room temperature hardening agent that is also activated upon exposure to the water-based liquid component. The powdered confectionary sugar ingredient, such as that manufactured by C&H, is an organic compound that functions as an additional low-cost room temperature hardening agent when activated upon exposure to the water-based liquid component. The polyvinyl alcohols listed above in Table 2, namely Selvo® 203s and 205s also function as room temperature hardening agents. Alternatively, a powdered glycerin may be used rather than polyvinyl alcohols; however, powdered glycerin may require additional grinding to achieve a desired level of integration throughout the dry or powdered component. The powdered surfactant ingredient, Acetylenic Diol, contained within the dry component is preferably Surfynol 500s, and functions to disperse the water-based liquid component throughout the dry or powder component, when the two components are subsequently combined. An alternative powdered surfactant, such as Siovation TPW-630, is also considered well within the scope of this invention. Structural integrity is provided to the 3-D printed casting shell by way of including a high temperature flux material to the dry component, namely Frit 3195 manufactured by the Ferro Corporation, however other fritted materials, such as those manufactured by the Ferro Corporation, are considered well within the scope of this invention. Thermal shock resistance, i.e., resistance to fracture caused by a sudden change in temperature of the shell during heat exposure, is provided to the resultant 3-D printed casting shell by Spinel® 25, preferably in a 325 mesh size. Lastly, a fumed silica, preferably Sperinate® 22s manufactured by Evonk Industries AG, is included to provided improved particle flow throughout the dry or powdered component during usage in the 3-D powder printer, as is described below.

After the respective components are combined, a thin layer of the powder component is deposited in a predetermined area at block 106. As previously discussed, preferably the layer of powder component is less than or equal to 100 µm. After the powder component has been deposited, a volume of the liquid component is dispersed over the top of the powder component in a predetermined location at block 108. At subsequent block 110 the liquid and powder components form a hydraulic bond resulting in the formation of a solid set mass at the location of overlap between the liquid component and powder component. As was also discussed above, blocks 106, 108 and 110 are then repeated, in which additional alternating layers of powder component and liquid component are applied in predetermined locations, thereby forming a 3-D refractory shell in a step-wise, layer-by-layer fashion. When used in a 3-D printer, an associated computer may specify the location of powder and liquid component application to correspond to a computer generated casting model. After the resultant 3-D refractory shell, having an interior cavity shape corresponding to the shape of the desired metal object, i.e., computer generated casting model, has been formed it may directly receive a molten metal into the interior cavity shape at block 112. Again, as previously discussed but not shown in FIG. 1, the resultant 3-D refractory shell may be dried, cleaned of excess refractory material, kiln heated, flash heated, autoclaved to a pressure of greater than 10.0 bars, and/or receive a face coating before receiving molten metal. Once the molten metal is then cooled, the refractory shell is removed at block 114.

In the previously discusses embodiments, the refractory material of the present invention is described as being generally formed by way of the hydraulic bonding of calcium aluminate cement at block 110. However, the present invention is not limited in scope to the exclusive use of calcium aluminate cement and other hydraulic bonding cements, i.e. hydraulic cement, are considered well within the scope of this invention. As used herein the term hydraulic cement is used to differentiate from the formation of refractory shells utilizing ceramic-based refractory materials. More specifically, ceramic-based refractory shells are formed in part by suspending small ceramic particles in a liquid carrier component. This suspension is formed into a desired shape, such as a refractory shell or a single layer of a 3-D printed refractory shell. The liquid carrier, often water, is then removed or evaporated during a drying phase, before the ceramic refractory shell is then fired to cause the formation of high strength sintering and bonding. Importantly, hardening required removal of the liquid carrier.

Differing from the term ceramic based refractory materials, as used herein, the hydraulic cement of the present invention may be distinguished in that it does not require a liquid component removal or evaporation in order to harden. That is to say that while ceramic based refractory materials require the removal of a liquid component during the method of forming a refractory shell, the formation of a refractory shell utilizing the hydraulic cement according to the present invention, and namely method 100, does not require the removal of a liquid component which instead forms part of a chemical reaction of the hardening process.

Further differentiating the cement of the present invention from ceramic-based refractory material is the occurrence of shrinkage during the formation of a refractory shell caused by removal of a component of the shell material such as the liquid carrier. As a result of both the drying and firing stages of manufacturing a ceramic-based refractory shell, the resultant shell is subject to shrinkage, such that the inner cavity of the shell may not precisely correspond to the desired metal casting. Alternatively, the formation of a refractory shell utilizing the present invention's hydraulic cement according to method 100 provides no or low shrinkage in both the shell and its inner cavity as a result of forming hydraulic bonds, such that it does not adversely impact the shape of the desired metal casting.

Figure 2:
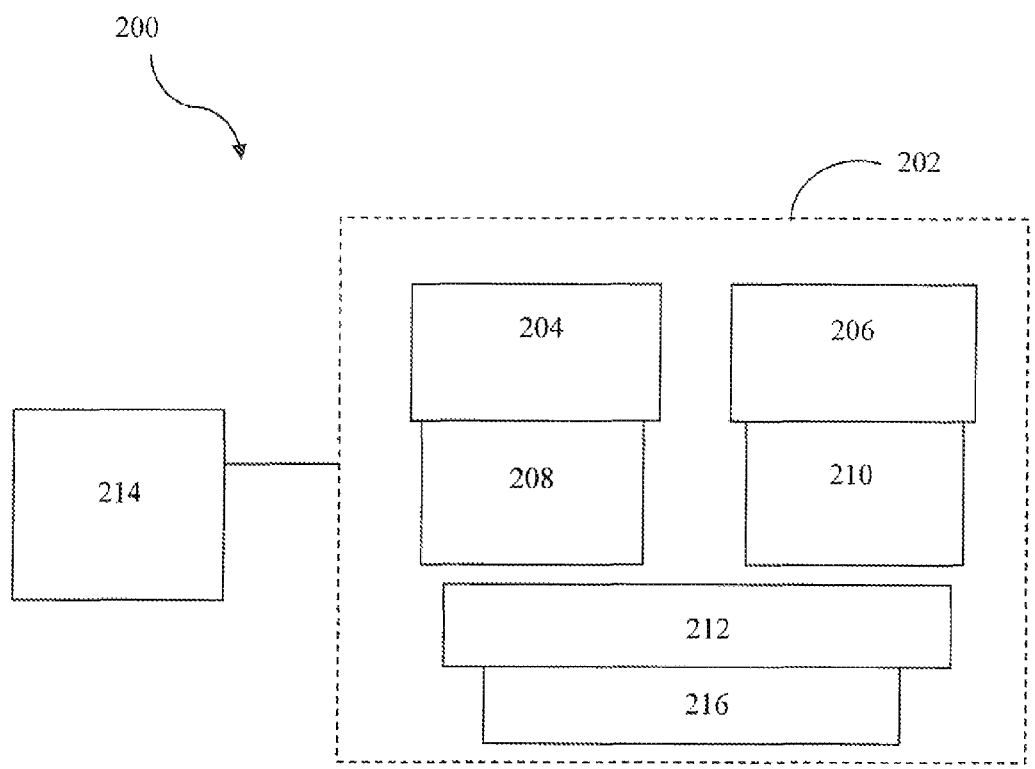
FIG. 2 is a schematic block diagram of a 3-D powder printing system for manufacturing refractory shell using the refractory material according to an embodiment of the present invention.

Turning now to FIG. 2, in one preferred embodiment, the method of forming the 3-D printed refractory shell in accordance with method 100 may be performed by a 3-D powder printer system 200. The system 200 may include an additive fabrication device 202 such as a 3-D powder printer, for example the device 202 may be one of those manufactured by ExOne, 3-D Systems or Voxel-jet, however its is in no way limited to such a devise. It is desirable that the 3-D printing device 202 or alternative additive fabrication device utilize a powder component of the formulations listed in above in Tables 1 and 2 or the alternatives discussed herein, having a particle size that is equal to or less than 100 μm in diameter, which is to say a particle size that is equal to or less than the step size of the 3-D powder printer 202. Such particle size is necessary to produce a 3-D refractory shell having an interior cavity of desirable smoothness, such as a root mean square (RMS) value of between 60-180 microinches, e.g. linger print detail. When in use, a volume of the dry or powdered component is stored in a power component receptacle 204 while a volume of liquid component is stored in a liquid component receptacle 206. In a step-wise and layer-by layer fashion. the powder component is dispensed from the receptacle 204 via applicator 208, while the liquid component is alternatively dispensed from its receptacle 206 via applicator 210. The powder and liquid components are dispensed from their respective applicators 208, 210 onto a stage 212 or build box. It is also desirable that the stage 212 or build box of the a 3-D powder printer 202 move in incremental steps equal to or less than 100 μm when it is vertically lowered after each iterative application of the liquid component in block 108, i.e. in a direction away from the powder and liquid component applicators 208, 210. This lowering of the stage of the 3-D printer directly correlates to the thickness of the layers of the 3-D refractory shell, and is again necessary to produce a either an outer shell having an inner cavity surface of finger print detail smoothness, or a core shell having an outer surface of finger print detail smoothness. Furthermore, the system 200 may also include a computer 214 that is connected to the 3-D powder printer 202, and provides the X-Y directional actuators 216 of the 3-D powder printer 202 with directional instructions for controlling (i) the lateral movement of the applicators 208, 210 or alternatively the lateral movement of stage 212, as is shown in FIG. 2, and (ii) the dispensing of the powder and liquid components from their respective applicators 208, 210. The computer 214 may receive its fabrication path instructions from a user input device or other means.

In an alternative preferred embodiment. the liquid component of the refractory material formulation of Tables 1 and 2 may be adjusted or modified by changing the elements of either the liquid or powder components. For example, the lithium chloride (LiCl) element of the liquid component, which functions as a hydraulic bond accelerator, and thereby reduces the set time of the calcium aluminate cement from several hours to approximately instantaneous, may be replaced with lithium carbonate ($Li_2CO_3$) or lithium nitrate ($LiNO_3$), which may increase the hydraulic bond set time, and/or alter the resultant bond strength. Alternatively a volume of a hydraulic bond inhibitor such as acetic acid, vinegar, or an alternative acidic solution may be added to the liquid component of the refractory material formulations of Tables 1 and/or 2 to form a weaker refractory material, when set. Such alternatives, including those that result in a weaker bond formation, may be highly desirable for improving refractory shell removal once the molten metal has cooled, and especially in areas that are difficult to remove, such as undercuts. Alternatively, such a hydraulic bond inhibitor may constitute a colloidal based solution to be added to the casting shell during the application of a face coat. i.e., refractory sealer, prior to receiving molten metal, which could in part a smoother RMS finish as well as provide an enhanced MOR.

Furthermore, it is considered within the scope of this invention that multiple different liquid or dry powder component formulations may be integrated into the formation of a single 3-D refractory shell, thereby allowing various portions of the 3-D refractory shell to exhibit different structural and chemical characteristics.

In another alternative preferred embodiment, the refractory shell formed in accordance with method 100 may also include integrated fluid manifolds in addition to the interior cavity shape corresponding to the shape of the desired metal object to be cast. In such an embodiment, the integrated fluid manifolds may include a void or channel enclosed by the walls of the refractory shell having an integrated access port, and separated from the interior cavity. During the casting stage, molten metal may be poured into the interior cavity, while one or more fluids may be pumped into the integrated fluid manifolds that surround the interior cavity. These various fluids may include argon gas, oxygen, nitrogen, or others. The benefits of including integrated fluid manifolds into the 3-D printed refractory shell include decreasing gas venting, decreasing cooling time, increasing heat venting, varying cooling times at various locations and correspondingly varying strength and grain size of the cast metal, inhibiting oxidation as non-reactive gasses permeate from the manifold through the refractory shall wall and engage the cast metal, and/or forming carbide or nitride surfaces on the cast metal.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to he construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A method forming a 3-D printed hydraulically bonded casting shell, the method comprising:
   forming at least one core casting shell by intermittently applying in a step-wise manner, a layer of a powder component comprising in part at least 25 percent by weight of a calcium aluminate cement in a predetermined area, and a volume of a liquid component comprising at least 50 percent by weight of a distilled water over the top of the powder component in a predetermined location,
   hardening the at least one core casting shell to form an at least one solid core casting shell comprising a plurality of hydraulic bonds at a location of overlap between the powder component and liquid component, wherein the solid core casting shell has an exterior surface that corresponds to a shape of a void in an object to be cast; and
   wherein the at least one core casting shell comprises at least a first shell portion and a second shell portion, and the hydraulic bonds of the first shell portion are stronger than the hydraulic bonds of the second shell portion.

2. The method of forming the casting shell of claim 1, further comprising the step of flash heating the at least one solid core casting shell.

3. The method of forming the casting shell of claim 1, wherein the powder component and liquid component are dispersed from a 3-D powder printer.

4. The method of forming the casting shell of claim 3, wherein the 3-D powder printer has a step size less than or equal to 100 μm and the particle size of the powder component is less than the step size of the 3-D powder printer.

5. The method of forming the casting shell of claim 1, wherein the at least one solid core casting shell is configured to withstand a temperature of 3000° F. and a pressure of 10.0 bars when the liquid and powder components are combined.

6. A method forming a 3-D printed hydraulically bonded casting shell, the method comprising:
   forming at least one exterior casting shell by intermittently applying in a step-wise manner, a layer of a powder component having a thickness less than or equal to 100 μm, the powder component comprising in part at least 25 percent by weight of a calcium aluminate cement in a predetermined area, and a volume of a liquid component comprising at least 50 percent by weight of a distilled water over the top of the powder component in a predetermined location,
   hardening the at least one exterior casting shell to form at least one solid exterior casting shell comprising a plurality of hydraulic bonds at a location of overlap between the powder component and liquid component, wherein the solid exterior casting shell includes an interior cavity corresponding to a shape of an object to be cast and
   wherein the at least one exterior casting shell comprises at least a first shell portion and a second shell portion, and the hydraulic bonds of the first shell portion are stronger than the hydraulic bonds of the second shell portion.

7. The method of forming the casting shell of claim 6; wherein the at least one solid exterior casting shell is formed integrally with an at least one solid core casting shell.

8. The method of forming the casting shell of claim 6; wherein the molten material is selected from a group including: metal, plastic, or glass.

9. The method of manufacturing a casting shell of claim 6, wherein the at least one solid exterior casting shell comprises one or more integrated fluid manifolds into the casting shell.

10. A method of 3-D printing a hydraulically bonded casting shell of, the method comprising:
    forming at least one exterior casting shell, the method comprising:
        intermittently applying in a step-wise manner, a layer of a powder component comprising in part at least 25 percent by weight of a calcium aluminate cement in a first predetermined area, and a volume of an at least one liquid component comprising at least 50 percent by weight of a distilled water over the top of the powder component in a first predetermined location,
        hardening the at least one exterior casting shell to form at least one solid exterior casting shell comprising a plurality of hydraulic bonds at a first location of overlap between the powder component and the at least one liquid component, wherein the solid exterior casting shell includes an interior cavity corresponding to a shape of an object to be cast forming least one core casting shell, the method comprising:
    intermittently applying in a step-wise manner, a layer of the powder component in a second predetermined area and a volume of the at least one liquid component over the top of the powder component in a second predetermined location,
    hardening the at least one core casting shell to form an at least one solid core casting shell comprising a plurality of hydraulic bonds at a second location of overlap between the powder component and the at least one liquid component,
    wherein the solid core casting shell has an exterior surface that corresponds to a shape of a void in the object to be cast; and
    wherein at least one of the solid exterior casting shell and the solid core casting shell comprises at least a first shell portion and a second shell portion; and
    wherein the hydraulic bonds of the first shell portion are stronger than the hydraulic bonds of the second shell portion.

11. The method of 3-D printing a hydraulically bonded casting shell of claim 10, wherein the at least one liquid component comprises a first liquid component and a second liquid component, and wherein the second liquid component resulting in a formation of the second shell portion includes a volume of a hydraulic bond inhibitor.

12. The method of 3-D printing a hydraulically bonded casting shell of claim 10, wherein the at least one core shell is configured to be received at a desired location within the interior cavity of at least one solid exterior casting shell prior to receiving a volume of molten material in the interior cavity of the at least one solid exterior casting shell.

13. The method of 3-D printing a hydraulically bonded casting shell of claim 10, wherein the powder component comprises at least one hardening agent selected from a group including: a resin glue; a powdered confectionary sugar; a polyvinyl alcohol; and a glycerin.

14. The method of 3-D printing a hydraulically bonded casting shell of claim 10, wherein the powder component comprises a powdered surfactant.

15. The method of 3-D printing a hydraulically bonded casting shell of claim 10, wherein the liquid component of the refractory material comprises hydraulic bond accelerator selected from a group including: lithium chloride; lithium carbonate; and lithium nitrate.

16. The method of 3-D printing a hydraulically bonded casting shell of claim 10, wherein the solid exterior casting shell and the solid core casting shell are configured to withstand a temperature of 3000° F. and a pressure of 10.0 bars.

17. The method of 3-D printing a hydraulically bonded casting shell of claim 10, wherein the powder component and liquid component are dispersed from a 3-D powder printer.

18. The method of 3-D printing a hydraulically bonded casting shell of claim 17, wherein the 3-D powder printer has a step size less than or equal to 100 μm and the particle size of the powder component is less than the step size of the 3-D powder printer.

19. The method of 3-D printing a hydraulically bonded casting shell of claim 10 wherein the at least one liquid component comprises a first liquid component and a second liquid component, and wherein the first liquid component resulting in a formation of the first shell portion has a concentration greater than the second liquid component resulting in a formation of the second shell portion.

20. The method of 3-D printing a hydraulically bonded casting shell of claim 10, wherein the powder component comprises spinel.

* * * * *